United States Patent Office 3,213,061
Patented Oct. 19, 1965

3,213,061
NORCAMPHANEDIOL POLYESTERS
John R. Caldwell, James E. Poe, and Winston J. Jackson, Jr., Kingsport, Tenn., assignors to Eastman Kodak Company, Rochester, N.Y., a corporation of New Jersey
No Drawing. Filed Sept. 14, 1961, Ser. No. 137,975
38 Claims. (Cl. 260—47)

This invention relates to novel intermediates for synthesis of polyesters. More particularly the invention relates to synthesis of 2,5- and 2,6-norcamphanediols and the synthesis of norcamphanediol polyesters.

An object of the invention is to provide 2,5- and 2,6-norcamphanediols and to provide methods for their synthesis. Another object is to provide useful polyesters of those norcamphanediols and methods for their synthesis. Another object is to provide bischloroformates of norcamphanediols, also useful as intermediates in polyester synthesis.

A mixture of 2,5- and 2,6-norcamphanediols is prepared by first adding acetic acid to the double bond of bicyclo(2.2.1)hept-5-ene-2-ol acetate and then treating the diacetate with methanol to produce the diol by ester interchange. Polyesters may be synthesized directly from the diol and an ester of a dibasic acid by known ester interchange processes, or the diol may be treated with phosgene to produce a diol bischloroformate which then is reacted with a bisphenol in an interfacial polycondensation process.

Norcamphanediols and norcamphanediol bischloroformates are useful as intermediates for synthesis of a great variety of useful esters and polyesters, polyurethanes, and polymer plasticizers. Various polyesters containing recurring units of norcamphanediol possess properties making them useful for making film, fiber, coating compositions and molded objects. Norcamphanediols have been made by several methods. Some are reported by H. A. Bruson in U.S. Patent 2,395,452, C.A. 40, 3138 (1946); Roberts et al. in J.A.C.S. 72, 3136 (1950); S. F. Birch et al. in J. Chem. Soc., 1947, 118–20; H. Kwart et al. in J.A.C.S., 76, 5400–3 (1954).

Preparation of a mixture of 2,5-norcamphanediol and 2,6-norcamphanediol is illustrated by the following equations.

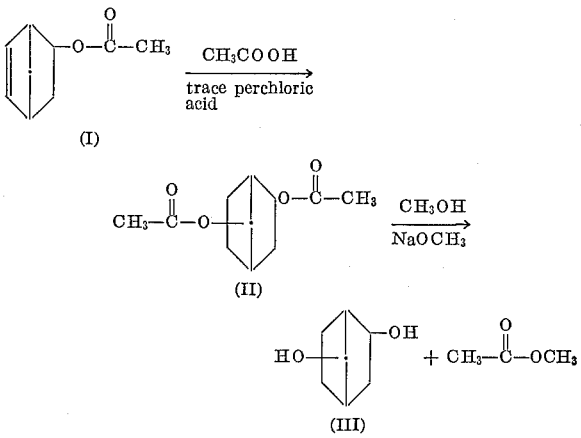

H. B. Knight et al. in J.A.C.S. 75, 6214 (1953) report the addition of formic acid to olefins in general, using 0.5 to 2% perchloric acid as catalyst.

The starting material, bicyclo(2.2.1)hept-5-ene-2-ol acetate (I), is prepared by a known method from cyclopentadiene and vinyl acetate. The addition of acetic acid to the olefin may take place using sulfuric acid as a catalyst but preferably is done using a trace of 60% perchloric acid. The amount of catalyst used may range from 0.1 to 1.0%, preferably 0.5% based on the weight of the olefin. The product obtained, norcamphanediol diacetate (II), is purified by distillation and then is converted to the diol anhydrous methanol and sodium methoxide in the conventional ester interchange method. The norcamphanediol is recrystallized from butyl acetate or other suitable solvent such as dioxane, or acetone. It may also be purified by sublimation. A mixture of 2,5-norcamphanediol and 2,6-norcamphanediol diacetate can be prepared by two methods.

Example I (A) A solution was made up of 608 g. (4 moles) bicyclo(2.2.1)hept-5-ene-2-ol acetate, 600 ml. (10.5 moles) of glacial acetic acid, and 24 ml. (0.22 moles) acetic anhydride and to this was added 3 ml. of 60% perchloric acid. The solution was refluxed for 1 hour. After cooling to room temperature the dark oily liquid was washed twice with 1000 ml. of water and then was washed a third time with enough sodium carbonate being added to give a neutral solution, the total volume of wash again being 1000 ml. Each of the washes was extracted with 100 ml. of benzene. The first two were combined with the third while in contact with the last water wash and enough sodium carbonate solution was added to give a neutral solution. The benzene extracts were combined with the reaction mixture and 17 g. of Darco G–60 was added. The solution was refluxed for 1 hour. During the refluxing period the water present may be removed as the benzene azeotrope. The solution was filtered at room temperature and the benzene was removed by distillation and the remaining oil was fractionated in a partial vacuum. The fraction boiling at 91–95° C. at 1 mm. was collected. The yield was 780 grams (92% theoretical) of a mixture of 2,5- and 2,6-norcamphanediol diacetate.

(B) A solution of 232 g. (1.50 moles) of bicyclo-(2.2.1)hept-5-ene-2-ol acetate in 500 g. glacial acetic acid was treated with 8 g. concentrated $H_2SO_4$ and the solution was stirred for 5 hours at 60–70° C. The residue was taken up in benzene, washed with water, aqueous bicarbonate solution, and then water and was distilled. A yield of 174 g. (55% theoretical) of the norcamphanediol diacetate mixture was obtained. The product boiled at 119° C./4 mm. $N_D^{20}=1.4652$.

Example II

To a solution of 387.4 g. (1.83 moles) of the 2,5- and 2,6-norcamphanediol diacetate mixture of Example I in 650 ml. of anhydrous methanol was added 19.4 g. sodium methylate. This solution was then refluxed for 1 hour, then 21.5 g. glacial acetic acid was added to neutralize the sodium methylate. The excess methanol (90–95%) was removed by vacuum distillation using a vacuum of 170–185 mm. The residue was recrystallized from 500 ml. of butyl acetate using 8 grams of Darco G–60. The yield was 191.7 grams (81.8% theoretical). The product melted at 175–179° C. Evaporation of the mother liquor to ⅓ its volume yields a second crop of crystals weighing 25.3 g. (10.8% theoretical) which melted at 166–182° C. Infrared and nuclear magnetic resonance measurements indicated that the product recrystallized from butyl acetate consisted of the 2,5-isomer and the 2,6-isomer of norcamphanediol. The 2,5-norcamphanediol predominated. The 2,5-isomer and 2,6-isomer can be separated by fractional crystallization from butyl acetate.

High molecular weight polyesters of the 2,5- (2,6-) norcamphanediol mixture can be prepared by both ester interchange and interfacial polycondensation procedures. Copolyesters may be prepared using a mixture of diols including these norcamphanediols, or using a mixture of diacids with norcamphanediol. High molecular weight polymers containing norcamphanediol were prepared by ester interchange between norcamphanediol and diacid esters, and by polycondensation of the norcamphanediol bischloroformate with bisphenols.

High molecular weight polyesters were obtained by heating the norcamphanediol product of Example II with dicarboxylic acid esters. Polyesters also may be made by the same method using dicarboxylic acid chlorides. Polyesters were made using 2,7-norcamphanediol as well as the 2,5- and 2,6-isomers.

Aromatic dicarboxylic acids that may be used in the process of Example II are described in U.S. Patent 2,720,506. Acids of particular value include terephthalic, isophthalic, 4,4'-sulfonyl dibenzoic, 4,4'-diphenic; 1,2-di-(4-carboxyphenyl)ethane, 1,2 - di - (4-carboxyphenoxy)ethane. The acids may contain substituents such as chlorine or methyl. Aliphatic dicarboxylic acids such as succinic, glutaric, adipic, pimelic, azelaic and sebacic may be used. Branched chain aliphatic acids may be employed as represented by dimethylmalonic, 2-ethylsuccinic, 3-methyladipic and 2-ethyl-4-propyladipic. Cyclic aliphatic acids of particular value are represented by 1,3- and 1,4-cyclohexanedicarboxylic acids (cis- and trans-isomers); 2,5- and 2,6-norcamphanedicarboxylic acid; dodecahydro-4,4'-diphenic acid. Carbonic acid, as a dialkyl or diaryl ester, may be used.

Polyesters may be prepared by heating an excess of norcamphanediol with an ester of a diabasic acid in the presence of a suitable catalyst. Copolyesters are made in a similar way using a mixture of norcamphanediols, another glycol and an ester of a dibasic acid. In preparing polycarbonates of the norcamphanediol, it is preferred to use a molar excess of ethyl or butyl carbonate over the total molar amount of glycol because the carbonic ester is so volatile that some will be evaporated during the polymerization reaction. Mixtures of two or more dicarboxylic esters may be used to give copolyesters. In general, any of the known polyester reaction catalysts may be used such as those described in U.S. Patents 2,720,502; 2,720,504 and 2,727,881.

The first stage of the reaction is carried out at a temperature of 180–230° C. and at atmospheric pressure, in order to distill the alcohol formed by the ester interchange and produce low molecular weight glycol esters. It is important to exclude oxygen and moisture at all stages of the reaction. The temperature is then raised to 240–300° C. or higher, depending upon the melting point of the polyester. Some of the excess glycol is distilled at this stage. The final stage of the reaction is carried out under vacuum and with good agitation in order to facilitate the escape of volatile products from the highly viscous melt. Alternatively, the polymer may be made by the solid phase process. A prepolymer having a viscosity of 0.15 to 0.30 is prepared by stirring the melted polymer in vacuum. This polymer is then removed from the vessel and pulverized to particle size 0.01 to 0.03 inch. The pulverized prepolymer is heated in a vacuum or in an inert gas system at 200–260° C., the temperature being maintained somewhat below the polymer melting point.

*Example III*

156 grams (1.2 moles) of the 2,5- and 2,6-norcamphanediol mixture described above and 194 g. (1.0 mole) of dimethylterephthalate were placed in a vessel equipped with a stirrer, a distillation column and an inlet for purified nitrogen. A solution of 0.02 g. titanium butoxide in 0.5 cc. butyl alcohol was added as catalyst. The mixture was stirred at 200–220° C. in a nitrogen atmosphere. Methyl alcohol produced by ester interchange was removed through the distillation column. The evolution of methyl alcohol practically ceased after 1 hour and the temperature was then raised to 280° C. and held for 15 minutes. A vacuum of 0.1 mm. was then applied and stirring was continued. The product solidified in 3–5 minutes. The prepolymer was then removed from the vessel and granulated to particle size of 0.01 inch. The granules were heated in a vacuum at 200° C. for 20 minutes, then at 220° C. for 15 minutes and then at 240–250° C. for 2.5 hours. The polyester had an inherent viscosity of 0.57 as measured in a solvent composed of 60 parts phenol and 40 parts tetrachloroethane. The product melted in a range of 340–360° C.

Using the same method a copolyester was prepared having composition: 1.0 mole terephthalic acid plus 0.8 mole norcamphanediol plus 0.2 mole tetramethylene glycol. This copolymer melted in the range of 319–339° C. This copolyester produces strong elastic fibers by the melt spinning process. It also is valuable as a molding plastic and as a photographic film base.

Using the same method a polyester of terephthalic acid and 2,7-norcamphanediol was prepared. The 2,7-norcamphanediol was prepared as described in J. Am. Chem. Soc., 76, 5400 (1954). The terephthalic acid polyester softened in a range of 300–330° C.

*Example IV*

200 grams (1.0 mole) of the dimethyl ester of trans-cyclohexane-1,4-dicarboxylic acid, 156 g. (1.2 moles) of the norcamphanediol described in Example I and 0.03 g. titanium butoxide catalyst were stirred at 200° C. in a nitrogen atmosphere. The methyl alcohol formed by ester interchange was removed by distillation. The temperature was then raised to 270° C. and held for 5 minutes. A vacuum of 0.2 mm. was applied and stirring was continued for 30–40 minutes. A high viscosity melt was obtained. The polyester melted at 235–245° C. It gave clear films when cast from tetrachlorethane solutions.

By the same method the polyester of adipic acid and 2,5-norcamphanediol was prepared. It melted at 140–160° C. and produced a clear tough film when cast from chlorinated solvents.

Using the same method the polyester of succinic acid and 2,5-norcamphanediol was prepared. It melted at about 230–250° C.

*Example V*

Two molecular portions of butyl carbonate and one molecular portion of the norcamphanediol prepared by the procedure of Example II were heated at 160–180° C. with 0.05% sodium butoxide catalyst. Butyl alcohol was distilled from the reaction mixture. The temperature was then raised to 200–220° C. to remove excess butyl carbonate and to form a low molecular weight polyester. The product was placed in a vessel equipped with a stirrer and 0.05% titanium butoxide polymerization catalyst was added. Temperature was raised to 250° C. and held for 10 minutes. A vacuum of 0.1 mm. was applied and stirring was continued. The polyester turned solid in 10–15 minutes. It was removed from the vessel and granulated to a particle size of 0.01 inch. The granulated prepolymer was then heated in a vacuum at 200° C. for 10 minutes, then at 220° C. for 15 minutes and then at 250° C. for 3 hours. The polymer melted in the range of 300–325° C. It gave clear strong films when cast from tetrachloroethane solution. The polymer is valuable as a photographic film base and as a molding plastic and as a fiber.

By the same procedure a copolyester was prepared having the composition: 0.74 mole norcamphanediol, 0.26 mole hexamethylene glycol and 1.0 mole carbonic acid. This polymer was readily soluble in methylene chloride and clear flexible films were cast from the solution.

By the same method a copolyester was prepared having the composition: 0.8 mole terephthalic acid, 0.2 mole isophthalic acid and 1.0 mole 2,5-norcamphanediol. This polymer softened in the range of 280–300° C. and was useful in the manufacture of fibers, films, and molded objects. The polyester made from 2,5-norcamphanediol and 4,4'- sulfonyldibenzoic acid, prepared as described above, softened in the range of 280–310° C.

Bischloroformates of the isomer mixture obtained by the synthesis of Example II were prepared by suspending the norcamphanediol in a solvent and passing in phosgene until a slight excess was present. It is advantageous to use a solvent which can also be used in the polymerization reaction, such as ethylene dichloride or methylene chloride. Using either of these solvents the reaction will proceed faster if dioxane is added as about ⅓ of the solvent mixture and the temperature is raised to 40–50° C. The diol bischloroformate dissolves in the solvent as it is formed. Higher temperatures can be used, but there is loss of some phosgene and slight decomposition of the product occurs. After the reaction is completed, dry air is passed into the solution until all of the hydrogen chloride and phosgene have been driven out. This solution can then be used for the preparation of polymers in interfacial polycondensation processes.

*Example VI*

A mixture containing 128 g. (1.0 mole) of 2,5- and 2,6-norcamphanediol mixture prepared by the procedure of Example II, and 400 ml. of dry ethylene dichloride and 200 ml. of dry dioxane was stirred at 40–50° C. while phosgene was passed in until 250 g. was taken up. This required about 3 hours; and, during this time, the diol slowly went into solution as it reacted. The solution was stirred for 3 hours longer at 40° C. and then was allowed to stand at room temperature overnight. Dry air was then passed into the stirred solution at 40–50° C. until all hydrogen chloride and excess phosgene had been carried off. The solution of bischloroformate was used in this form for interfacial polycondensation processes. The pure bischloroformate was obtained by distilling off the solvent at 40° C. at reduced pressure and then recrystallizing the residue from an equal amount of hexane (cooled in a cold box). The white crystals melted at 47–51° C.

By the same process a bischloroformate was prepared from 2,7-norcamphanediol, melting point 54–56° C.

Using the bischloroformate solutions prepared in Example VI a number of polyesters were prepared by reacting the bischloroformate with a bisphenol in an interfacial polycondensation process. Examples of processes in which this particular bischloroformate was used appear in the copending application Serial No. 137,980, now abandoned, of Caldwell and Jackson entitled "Bisphenol Polyesters" filed of even date herewith.

Polyesters containing polycondensation residues of norcamphanediol bischloroformates have been produced by interfacial polycondensation procedures. Specific examples are described in the said copending application. The bischloroformates of the 2,5-, 2,7-, and 2,6-norcamphanediols can be condensed with a variety of bisphenols including 4,4'-(2-norcamphanylidene)diphenol, Bisphenol A (isopropylidene diphenol), isobutylidene diphenol, 4,4'-isopropylidene di-o-cresol (prepared from acetone and o-cresol), 4,4'-isopropylidene bis(2,6-dichlorophenol), 4,4'-sulfonyldiphenol, 4,4'-dihydroxydiphenyl, and a number of other bisphenols. Mixed polycarbonates and mixed polyesters have been made by reacting a mixture of the 2,5- and 2,6-norcamphanediol bischloroformates and other diacid chlorides with bisphenols in an interfacial polycondensation reaction.

The examples in the detailed description above are given as specific embodiments of the invention and should not be construed to limit the scope of the invention as defined in the following claims.

We claim:

1. A linear thermoplastic polyester of (A) at least one dibasic carboxylic acid and (B) at least one dihydroxy compound of which the major mole proportion is selected from the group consisting of the 2,5-, the 2,6- and the 2,7-isomers of norcamphanediol, which polymer melts at about above 140° C. and below about 360° C. and is capable of being formed into fibers and film.

2. A polyester as defined by claim 1 wherein the major mole proportion of (A) is an aromatic acid.

3. A polyester as defined by claim 2 wherein the major mole proportion of (A) is terephthalic acid.

4. A polyester as defined by claim 3 which melts at about 340°–360° C. wherein (A) is terephthalic acid and (B) is a mixture of 2,5-norcamphanediol and 2,6-norcamphanediol.

5. A polyester as defined by claim 3 wherein (A) is terephthalic acid and (B) is a mixture of tetramethylene glycol, 2,5-norcamphanediol and 2,6-norcamphanediol.

6. A polyester as defined by claim 5 which melts at about 319°–339° C. wherein said tetramethylene glycol constitutes about 20 mole percent of said component (B).

7. A polyester as defined by claim 3 which melts at about 300°–330° C. wherein (A) is terephthalic acid and (B) is 2,7-norcamphanediol.

8. A polyester as defined by claim 3 wherein (A) is a mixture of terephthalic acid and isophthalic acid.

9. A polyester as defined by claim 8 which softens at about 280°–300° C. wherein (A) is about 80 mole percent terephthalic acid and 20 mole percent isophthalic acid, and (B) is 2,5-norcamphanediol.

10. A polyester as defined by claim 2 wherein the major proportion of (A) is 4,4'-sulfonyldibenzoic acid.

11. A polyester as defined by claim 10 which softens at about 280°–310° C. wherein (A) is 4,4'-sulfonyldibenzoic acid and (B) is a mixture of 2,5-norcamphanediol and 2,6-norcamphanediol.

12. A polyester as defined by claimed 1 wherein the major proportion of (A) is a cyclohexanedicarboxylic acid.

13. A polyester as defined by claim 12 wherein (A) is trans-cyclohexane-1,4-dicarboxylic acid.

14. A polyester as defined by claim 13 which melts at about 235°–245° C. wherein (B) is a mixture of 2,5-norcamphanediol and 2,6-norcamphanediol.

15. A polyester as defined by claim 1 wherein the major mole proportion of (A) is an aliphatic acid.

16. A polyester as defined by claim 15 wherein (A) is adipic acid.

17. A polyester as defined by claim 16 which melts at about 140°–160° C. wherein (A) is adipic acid and (B) is a mixture of 2,5-norcamphanediol and 2,6-norcamphanediol.

18. A polyester as defined by claim 15 wherein (A) is succinic acid.

19. A polyester as defined by claim 18 which melts at about 230°–250° C. wherein (A) is succinic acid and (B) is a mixture of 2,5-norcamphanediol and 2,6-norcamphanediol.

20. A polyester as defined by claim 1 which is a polycarbonate.

21. A polycarbonate as defined by claim 20 which melts at about 300°–325° C. wherein (B) is a mixture of 2,5-norcamphanediol and 2,6-norcamphanediol.

22. A polycarbonate as defined by claim 20 wherein (B) is a mixture of hexamethylene glycol, 2,5-norcamphanediol and 2,6-norcamphanediol.

23. A polycarbonate as defined by claim 20 wherein (B) is comprised of a substantial mole proportion of a bisphenol.

24. A linear thermoplastic polyester of at least one dibasic acid and at least one diol and containing units consisting of the polycondensation residue of norcamphanediol.

25. A fiber of the polyester defined by claim 24.
26. A fiber of the polyester defined by claim 2.
27. A fiber of the polyester defined by claim 3.
28. A fiber of the polyester defined by claim 20.
29. A film of the polyester defined by claim 24.
30. A film of the polyester defined by claim 2.
31. A film of the polyester defined by claim 3.

32. A film of the polyester defined by claim 15.
33. A film of the polyester defined by claim 20.
34. 2,5-norcamphanediol.
35. 2,6-norcamphanediol.
36. 2,5-norcamphanediol bischloroformate.
37. 2,6-norcamphanediol bischloroformate.
38. 2,7-norcamphanediol bischloroformate.

References Cited by the Examiner

UNITED STATES PATENTS

| | | | |
|---|---|---|---|
| 2,426,725 | 9/47 | Bruson | 260—487 |
| 2,787,630 | 4/57 | Katz | 260—463 |
| 2,873,291 | 2/59 | Spiegler | 260—463 |
| 2,923,732 | 2/60 | Norton | 260—463 |
| 2,968,646 | 1/61 | Caldwell | 260—67 |
| 3,028,365 | 4/62 | Schnell | 260—47 |
| 3,049,506 | 8/62 | Kibler | 260—75 |

OTHER REFERENCES

Soloway: J. Org. Chem., vol. 25, page 328 (1960).
Fieser: Organic Chemistry, pages 117 and 178 (1956).

MURRY TILLMAN, *Primary Examiner.*

HAROLD N. BURSTEIN, *Examiner.*